US012755124B1

(12) United States Patent
Ulloa et al.

(10) Patent No.: US 12,755,124 B1
(45) Date of Patent: Oct. 6, 2026

(54) PAYMENT CARD WITH EMBEDDED TOKENIZED INCOME AUTHORIZATION AND INSTITUTIONAL RETURN ENFORCEMENT IN A TRACED-INCOME FINANCIAL SYSTEM

(71) Applicant: MONTECRISTO CORE SYSTEM LLC, Wilmington, DE (US)

(72) Inventors: Miguel Jose Macias Ulloa, Wilmington, DE (US); Gaston Damian Pogoda, Wilmington, DE (US)

( * ) Notice: Subject to any disclaimer, the term of this patent is extended or adjusted under 35 U.S.C. 154(b) by 0 days.

(21) Appl. No.: 19/566,729

(22) Filed: Mar. 13, 2026

Related U.S. Application Data

(63) Continuation-in-part of application No. 19/277,882, filed on Jul. 23, 2025.

(51) Int. Cl.
*G06K 19/07* (2006.01)

(52) U.S. Cl.
CPC ................................ *G06K 19/0723* (2013.01)

(58) Field of Classification Search
CPC ................................................ G06K 19/0723
USPC ........................................................ 235/492
See application file for complete search history.

(56) References Cited

U.S. PATENT DOCUMENTS

| | | | | |
|---|---|---|---|---|
| 9,202,250 | B1 * | 12/2015 | Palaniappan ........ | G06Q 40/125 |
| 11,094,020 | B1 * | 8/2021 | Lee ....................... | G06F 16/215 |
| 11,861,699 | B1 * | 1/2024 | Santa Cruz Masoni ..................... | G06Q 40/03 |
| 11,869,096 | B2 * | 1/2024 | Aaron .................. | G06Q 20/342 |
| 2024/0144388 | A1 * | 5/2024 | Palaniappan ........ | G06Q 20/108 |

* cited by examiner

*Primary Examiner* — Daniel A Hess
(74) *Attorney, Agent, or Firm* — Christian Sanchelima; Jesus Sanchelima

(57) ABSTRACT

A payment card for use in a traceable-income financial transaction system includes a secure hardware element storing cryptographic tokens linked to tokenized income objects containing metadata for payer, classification, timestamp, and allocation rules. The card transmits the token via EMV or NFC to a licensed terminal. A transaction validation engine authorizes the transaction only when the token matches an unspent income object and allocates a portion of the transaction value to institutional recipients. The card is inoperable outside licensed environments and does not rely on traditional credit scoring. This architecture enforces institutional return compliance and secure, source-based consumption.

20 Claims, 5 Drawing Sheets

PAYMENT CARD WITH EMBEDDED TOKENIZED INCOME AUTHORIZATION AND INSTITUTIONAL RETURN ENFORCEMENT IN A TRACED-INCOME FINANCIAL SYSTEM

OTHER RELATED APPLICATIONS

This application is a Continuation-in-Part of U.S. patent application Ser. No. 19/277,882, filed Jul. 23, 2025, entitled "Financial Architecture for Source-Based Consumption and Credit with Integrated Institutional Return," the entirety of which is incorporated herein by reference.

BACKGROUND OF THE INVENTION

Field of the Invention

The present invention relates generally to payment systems and, more particularly, to a payment card architecture that integrates with a traced-income financial transaction system, enabling transactions authorized solely on the basis of verified, tokenized income objects and mandating institutional return allocations within a structurally indivisible financial infrastructure.

Description of the Related Art

Traditional credit cards, debit cards, and prepaid cards operate on models dependent on conventional bank accounts, credit histories, and third-party financial intermediaries. These systems typically authorize transactions based on credit scoring, available funds, or account balances, without structural enforcement of specific allocation rules for institutional returns.

While modern payment networks have incorporated EMV chip technology, NFC contactless interfaces, and tokenization, such systems primarily secure transaction credentials rather than integrate income-source tracing or enforce mandatory institutional distributions as part of the transaction architecture.

Tokenization in the context of existing payment systems generally replaces sensitive data with non-sensitive equivalents for security, but it does not fundamentally restructure the transaction to rely on verified income sources or embed allocation rules into the transactional object itself.

There is an unmet need for a payment instrument that functions within a licensing-based financial ecosystem, where the instrument's authorization and use are inherently tied to the consumption of cryptographically bound, source-verified income tokens that cannot be spent outside of the licensed infrastructure.

Such a payment instrument must not only validate the source and classification of the income object, but also enforce the mandatory routing of a predefined portion of each transaction to institutional recipients, ensuring compliance with an integrated return engine, and preventing circumvention through external wallets, unauthorized systems, or functionally equivalent proxies.

SUMMARY OF THE INVENTION

The invention provides a payment card that operates exclusively within a traced-income transaction ecosystem. The card contains a secure hardware element that stores cryptographic tokens linked to tokenized income objects, each object containing metadata defining the payer, income classification, issuance time, and a unique ID. When presented at a point-of-sale terminal, the card transmits the token via EMV, NFC, or other communication protocols.

A transaction validation engine, operating within the licensed ecosystem, authorizes the transaction only if (i) the token corresponds to an unspent income object matching the transaction's amount and classification, and (ii) a portion of the transaction value is allocable to institutional recipients per the metadata rules. The card cannot function in unlicensed environments, and its logic, whether embedded or connected, prevents circumvention through proxies, simulations, or unauthorized wallets.

This architecture enables credit and consumption without reliance on traditional credit scoring, enforces structural compliance with institutional return requirements, and provides a secure, tamper-resistant payment mechanism tied to verified income sources.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
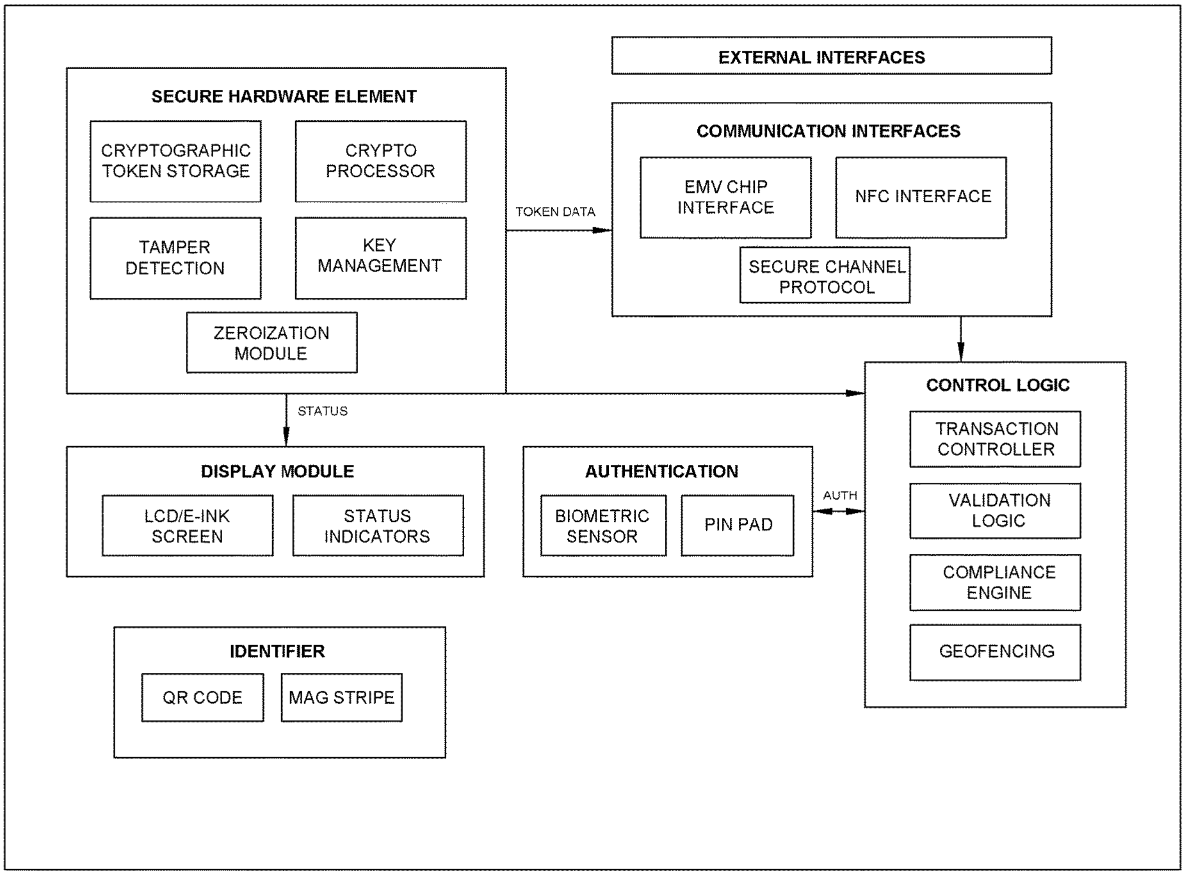
FIG. 1 is a block diagram of the payment card hardware architecture, including secure hardware element, communication interfaces, and display module.
Figure 2:
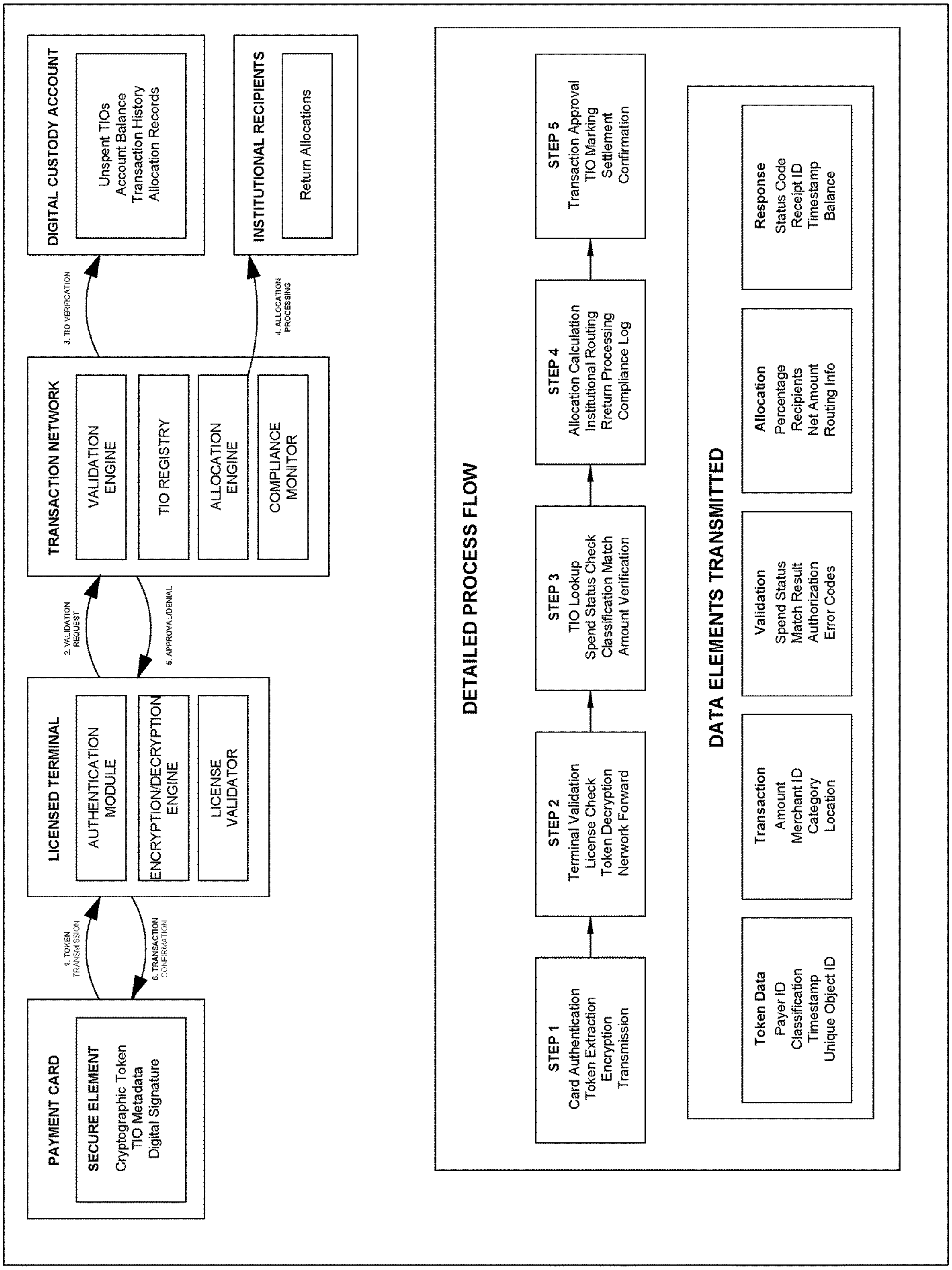
FIG. 2 is a data flow diagram illustrating the transmission of the cryptographic token from the card to the licensed terminal and subsequent validation steps.
Figure 3:
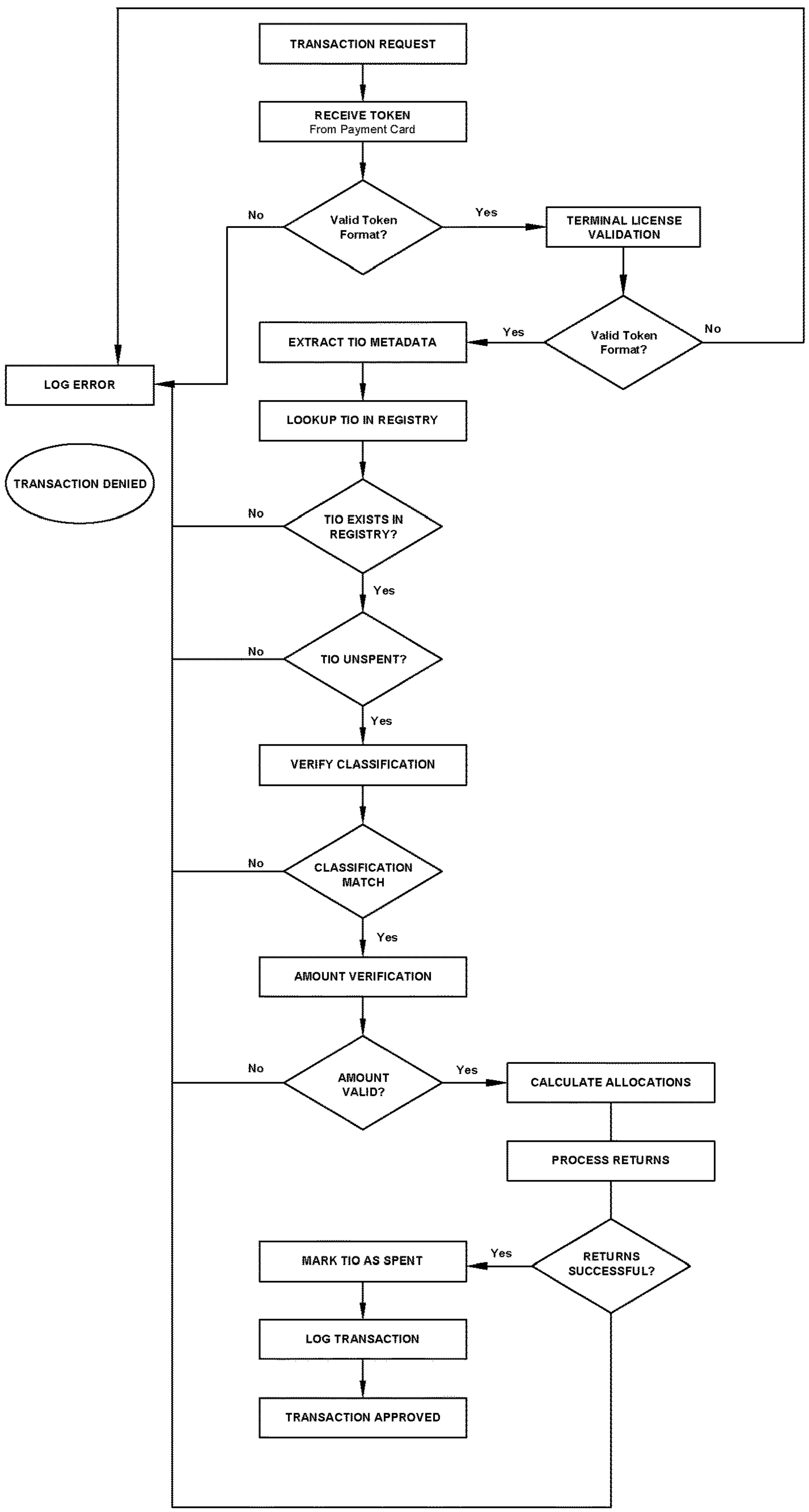
FIG. 3 is a flowchart of the transaction validation process, including unspent income object verification and institutional allocation enforcement.
Figure 4:
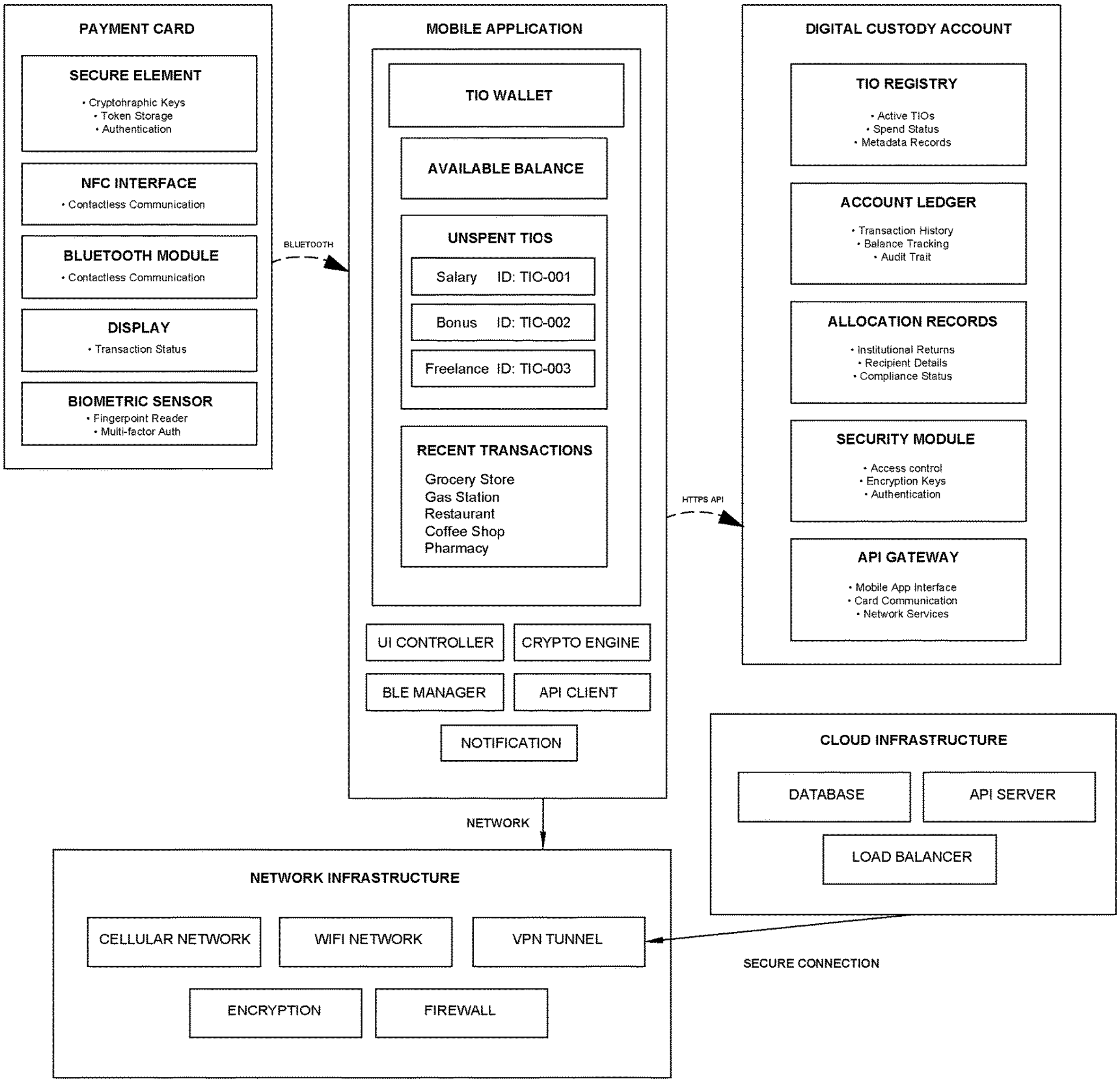
FIG. 4 is a schematic showing integration of the payment card with a mobile application linked to a digital custody account.
Figure 5:
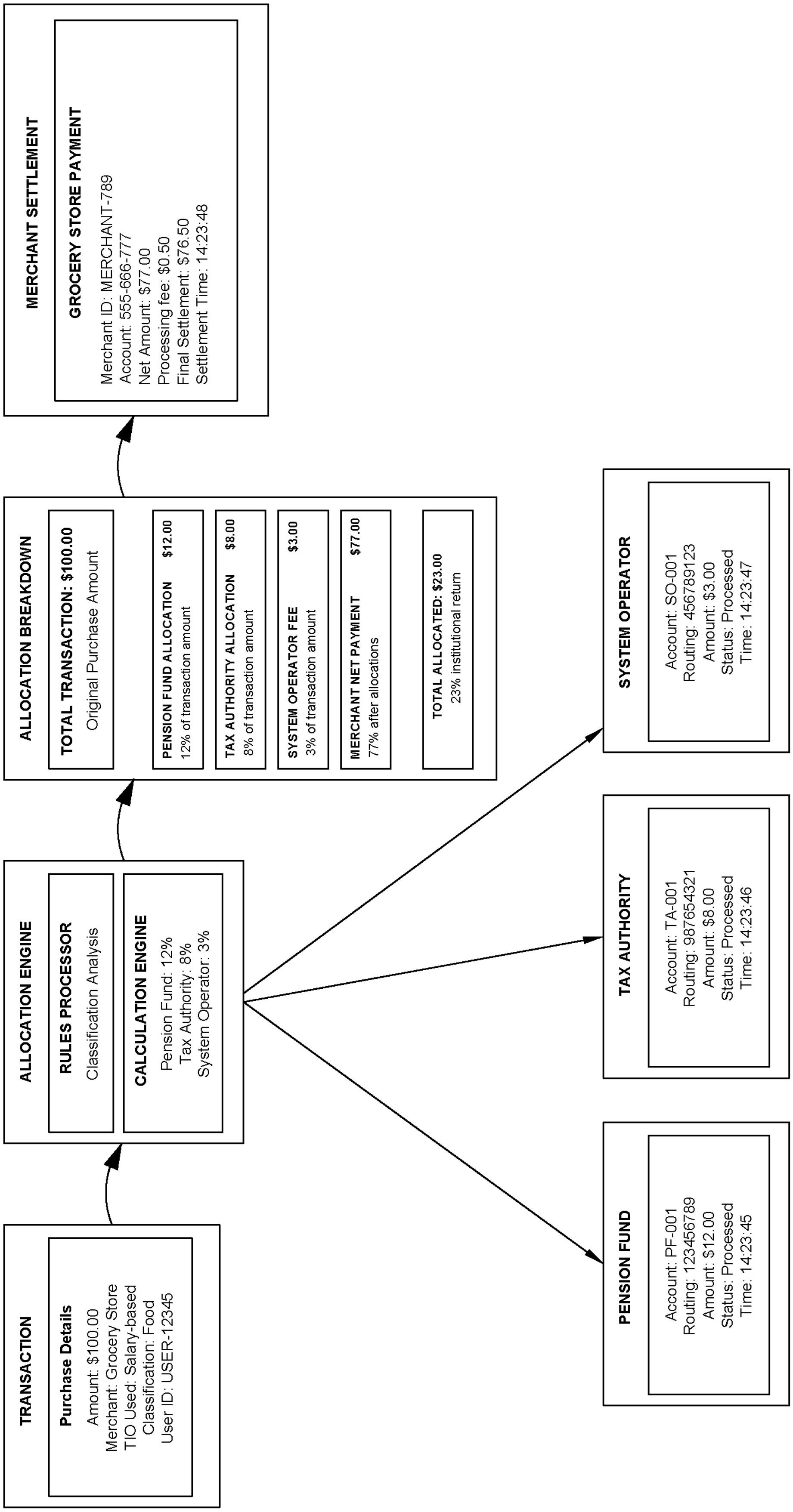
FIG. 5 is an example institutional return allocation process executed upon transaction approval.

The payment card described herein is specifically designed to operate within a closed-loop, licensing-controlled transaction ecosystem. Each transaction conducted with the card originates from the consumption of tokenized income objects (TIOs) that are stored in a digital custody account linked directly to the cardholder's profile. The system is architected to ensure that no transaction may occur without cryptographic verification of both the authenticity and classification of the TIO. Unlike traditional credit cards or debit cards, the authorization process does not rely on credit scores or bank balances. Instead, it verifies that the income object being used is an unspent, source-verified unit within the licensed architecture.

The secure hardware element (SE) embedded within the card is tamper-resistant and designed to protect the integrity of the tokenized income data it stores. This SE is capable of performing cryptographic signing operations locally, ensuring that transaction tokens cannot be forged or altered. In certain embodiments, the SE is capable of generating one-time transaction keys to prevent replay attacks. The secure element can be provisioned and updated remotely through secure over-the-air (OTA) protocols approved by the licensed system operator. This design enables both robust security and flexibility for feature updates without requiring card replacement.

Each TIO stored in the digital custody account contains metadata essential for enforcing system rules. This metadata includes the payer identifier, which uniquely links the income to its source, and the classification of the income, which governs spending eligibility. An issuance timestamp is included to ensure time-based usage constraints can be enforced, and a unique object ID provides a cryptographic anchor for verification. Additionally, the metadata contains instructions for institutional allocation, ensuring that a portion of each transaction is automatically routed to designated recipients before settlement. This metadata is immutable once issued, preventing post-issuance manipulation.

During a transaction, the card can communicate via contact-based EMV chip interaction or contactless NFC tap, depending on the merchant terminal's capabilities. The transaction initiation process includes mutual authentication between the card and the terminal to ensure that both parties are operating in a licensed environment. Once authenticated, the card transmits the cryptographic token associated with the selected TIO. This transmission is conducted over an encrypted channel, ensuring that no sensitive information is exposed in transit. The system supports both ISO 7816 and ISO 14443 standards for maximum compatibility.

The transaction validation engine resides within the licensed network infrastructure and is responsible for enforcing all core system rules. Upon receiving a token from the card, the engine verifies its authenticity and checks whether it corresponds to an unspent TIO. The engine then confirms that the TIO classification aligns with the transaction type and amount. If any of these checks fail, the transaction is declined with a specific denial code for audit purposes. Approved transactions trigger immediate allocation routing before the merchant receives settlement.

Institutional allocation enforcement is at the heart of this invention's compliance framework. The allocation process is non-optional and executed automatically upon transaction approval. The system ensures that designated recipients-such as pension funds, government agencies, or licensed operators-receive their portion of the transaction in real time. This allocation occurs prior to any disbursement of net funds to the merchant, ensuring institutional beneficiaries are prioritized. A record of the allocation is stored in both the transaction log and the TIO lifecycle ledger for auditing.

The payment card's licensing compliance features prevent it from operating in unlicensed environments. This restriction is enforced through a combination of whitelist-based terminal authentication and jurisdiction-specific geofencing. The whitelist is maintained by the system operator and updated dynamically through secure channels. Terminals that fail licensing verification are automatically denied access to the transaction network. In certain embodiments, the card may self-destruct its token storage if repeated unauthorized use attempts are detected.

To prevent circumvention, the system includes a misuse detection protocol that identifies attempts to use cryptographic proxies, simulated return engines, or unauthorized stablecoin implementations. Such attempts are logged, and the user's card is placed on a suspension list pending investigation. The detection system employs AI-driven anomaly detection to identify suspicious transaction patterns that deviate from authorized usage norms. In more advanced versions, the card itself can perform pre-validation heuristics before transmitting a token. This layered approach greatly reduces the risk of system exploitation.

Offline transaction capability allows the card to function temporarily in environments without network connectivity. In offline mode, the secure element maintains an internal counter of authorized offline transactions, which is reconciled when connectivity is restored. Each offline transaction includes a cryptographic proof that can be validated later by the central system. The offline mode is subject to strict limitations on transaction value and quantity to mitigate risk. This ensures usability without compromising security or compliance.

The card may be paired with a mobile application that serves as the user interface for managing tokenized income balances. The application can display real-time spending power, detailed transaction history, and institutional allocation summaries. Users can also set spending preferences, such as prioritizing certain income classifications for specific types of transactions. The mobile app uses end-to-end encryption for all communications with the custody account. Additionally, the app can serve as a secondary authentication factor for high-value transactions.

Geofencing and jurisdictional controls ensure that the card can only be used in regions approved by the licensed system operator. The geofencing system is integrated with real-time location verification using the merchant terminal's geographic data. If a transaction attempt occurs outside the approved jurisdiction, the system immediately declines it. This capability also supports sovereign immunity lockout features, ensuring that certain transactions are blocked in compliance with legal restrictions. Such controls are valuable for cross-border regulatory compliance.

Biometric security features can be integrated directly into the card's surface, enabling fingerprint or thumbprint verification prior to token release. This biometric data is stored only within the secure element and never transmitted externally. The biometric check serves as a safeguard against card theft or loss. Combined with PIN verification, the system offers multi-factor authentication for enhanced protection. These features make the card suitable for high-security financial environments.

Tamper detection mechanisms are embedded within the physical design of the card. If physical probing of the secure element is detected, the card automatically erases all stored tokens and cryptographic keys. This zeroization process is irreversible, rendering the card unusable until reissued by the system operator. The tamper detection system includes both mechanical and electrical triggers to ensure broad coverage against intrusion attempts. Such features are critical for compliance with payment security standards like PCI DSS.

The expiration of unspent tokens is an optional system rule that can be configured at the issuance stage. Tokens with expiration dates encourage timely spending and reduce long-term system liabilities. Expired tokens are cryptographically invalidated and cannot be used for transactions. Users receive advance notifications via the mobile application to avoid unintentional loss of value. This feature also supports policy-driven distribution cycles for certain institutional programs.

Finally, the payment card operates as a subsystem fully compatible with the parent architecture described in the base patent. All token issuance, custody, validation, and return enforcement mechanisms are maintained in accordance with the broader source-based consumption and credit system. This ensures interoperability between the card-based interface and other system access points, such as mobile wallets or merchant-specific terminals. By integrating into the existing architecture, the card leverages established security and compliance infrastructure. This seamless integration supports both scalability and rapid adoption within licensed ecosystems The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A payment card configured for use within a computer-implemented financial transaction system, the card comprising:

a) a secure hardware element embedded in the card and configured to store a cryptographic token uniquely associated with a tokenized income object, the tokenized income object comprising metadata including a payer identifier, income classification, issuance timestamp, and a unique object ID;

b) a contactless or contact-based communication interface configured to transmit the cryptographic token to a point-of-sale terminal during a transaction attempt;

c) a machine-readable identifier linking the card to a digital custody account storing one or more unspent tokenized income objects; and d) logic encoded in the hardware element or stored in a connected system that enables transaction approval only when a transaction validation engine confirms that:

i. the received token corresponds to an unspent income object matching the transaction amount and classification; and ii. a portion of the transaction value is allocable to one or more institutional recipients as specified by the metadata of the tokenized income object;

e) wherein the card is operable only through authorization by a traced income-based validation system and does not rely on traditional credit scoring or financial history.

2. The payment card of claim 1, wherein the card is an EMV chip-enabled card.

3. The payment card of claim 1, wherein the card supports contactless communication via near-field communication (NFC).

4. The payment card of claim 1, wherein the secure hardware element is configured to perform local cryptographic signing of transaction tokens.

5. The payment card of claim 1, wherein the card includes a user-facing display that provides transaction status based on validation results.

6. The payment card of claim 1, wherein the card may not be used outside of the licensed system, and any external wallet, card, or payment instrument not integrated with the return engine is automatically blocked.

7. The payment card of claim 1, wherein execution of a transaction using the card constitutes automatic structural infringement if it bypasses return mechanisms defined in the authorized architecture.

8. The payment card of claim 1, wherein any attempt to use cryptographic proxies, tokens, or stablecoins that simulate institutional return without actual redistribution constitutes system misuse.

9. He payment card of claim 1, wherein the secure element within the card prevents functionality in any environment that lacks validated system licensing or routing compliance.

10. The payment card of claim 1, further comprising a means for securely transmitting cryptographic income tokens from the card to a licensed terminal during a transaction attempt.

11. The payment card of claim 1, further comprising a means for validating that a cryptographic token corresponds to an unspent, classified income object prior to executing the transaction.

12. The payment card of claim 1, further comprising a means for restricting the card's operability to only environments integrated with a licensed transaction authorizer.

13. The payment card of claim 1, wherein the machine-readable identifier is encoded as a QR code, magnetic stripe data, or an embedded chip ID.

14. The payment card of claim 1, wherein transaction approval triggers automated logging of validation outcomes to a tamper-resistant ledger.

15. The payment card of claim 1, wherein the cryptographic token is periodically refreshed to prevent replay attacks.

16. The payment card of claim 1, wherein the card is paired with a mobile application that displays available credit derived from unspent income objects.

17. The payment card of claim 1, wherein institutional allocation percentages are determined dynamically based on transaction type or merchant category.

18. The payment card of claim 1, wherein a biometric authentication module is embedded in the card for transaction initiation.

19. The payment card of claim 1, wherein the card prevents completion of a transaction if the institutional allocation metadata is missing, incomplete, or altered.

20. The payment card of claim 1, wherein a transaction denial occurs if an unlicensed merchant processing environment is detected.

* * * * *